United States Patent

[11] 3,614,238

| [72] | Inventor | David G. Stites |
| | | Woburn, Mass. |
| [21] | Appl. No. | 695,988 |
| [22] | Filed | Jan. 5, 1968 |
| [45] | Patented | Oct. 19, 1971 |
| [73] | Assignee | Itek Corporation |
| | | Lexington, Mass. |

[54] BRIGHT LINE RETICLE APPARATUS AND OPTICAL ALIGNMENT METHODS
15 Claims, 7 Drawing Figs.

[52] U.S. Cl. ........................................... 356/124,
356/152, 356/153, 356/172
[51] Int. Cl. .................................................. G01b 11/27
[50] Field of Search .......................................... 356/153,
172, 127, 124, 138, 152, 139, 125

[56] References Cited
UNITED STATES PATENTS
| 3,197,643 | 7/1965 | Morris ........................... | 356/152 |
| 3,349,664 | 10/1967 | Kohlenberger ................ | 356/152 |
| 3,470,377 | 9/1969 | Le Febre et al. ............... | 356/138 |
| 2,577,807 | 12/1951 | Pryor ............................. | 356/153 |

FOREIGN PATENTS
| 963,884 | 1964 | Great Britain ................ | 356/153 |

OTHER REFERENCES
Metrology with Autocollimators, K. J. Hume, T 50 H8

*Primary Examiner*—Ronald L. Wibert
*Assistant Examiner*—J. Rothenberg
*Attorneys*—Homer O. Blair, Robert L. Nathans and Joseph S. Iandiorio

ABSTRACT: Apparatus for use with an alignment instrument. The apparatus includes a bright line reticle with a dark field background, condenser means for directing radiant energy through the bright line reticle, an alignment reference reticle representative of the reference axis and image projection and return means for projecting an image of the bright line reticle to the instrument and for receiving the projected image reflected back from the instrument and transmitting that reflected image to the reference reticle to provide a quantitative representation of the displacement between that reflected image and the reference reticle.

Fig. 2

INVENTOR.
DAVID G. STITES
BY
Joseph S. Sandiorio
ATTORNEY

INVENTOR.
DAVID G. STITES
BY
Joseph S. Sandiano
ATTORNEY

BRIGHT LINE RETICLE APPARATUS AND OPTICAL ALIGNMENT METHODS

BACKGROUND OF INVENTION

This invention relates to optical alignment apparatus and methods and, more particularly, to apparatus and methods using a bright line, high contrast reticle for quantitative measurement of optical component alignment.

One of the most critical factors involved in the production of high quality optical systems is the alignment of each of the various optical components relative to the instrument housing and the image plane of the instrument.

Precision machinery and shaping processes are used to produce compatible optical components and instrument housings, resulting in optical instruments with minimum alignment errors. However, even with such precise tools and techniques the alignment errors from these purely mechanical methods are inferior with respect to the error tolerances required by many phases of modern technology.

The optical alignment precision afforded by mechanical methods is limited by the inability of the machinery to produce perfect geometric shapes because of inherent errors in the machines, such as caused by bearing play, bearing coning, and positioning error. The precision of mechanical methods is further significantly limited by the fact that even a geometrically perfect optic component may not have its optic axis coincident with its geometric axis because of nonhomogeneity in the material of the optical component. Alignment thus depends solely upon the quality of fit of the lens and lens mounting components.

Final optical alignment of optical components, therefore, has been accomplished by optical alignment whereby alignment of a particular optical component with a common reference or system axis is established. One method presently employed uses an instrument with a bright line reticle on a dark background to determine alignment errors: deviations between the axes of individual optical components and the system axis are compensated for or nulled by adjusting the position of the component or the instrument until the deviation is eliminated. But such nulling methods indicate only that a particular optical component is or is not properly aligned: no reliable quantitative measure of misalignment is available; only the fact of misalignment is indicated. In addition, such nulling techniques generally do not account for the inherent, often substantial, error in the common or reference axis established by the instrument which may be a type of alignment telescope.

Bright line reticle instruments are preferable to standard dark reticles in aligning optical components such as lenses because the antireflective coating on most optical components reduces their surface reflectance to a level below that required to produce a reflected image of the dark line reticle having the necessary contrast to permit visual detection.

Attempts to apply the bright line reticle used in the simple nulling instruments to more complex instruments capable of quantitative evaluations, such as alignment telescopes with optical micrometers, have met with indifferent success. This lack of success is due in part to the presence of the black background necessary to frame the bright line reticle. This black background prevents the reflected image of the bright line reticle from reaching the eyepiece where the operator may see it and adjust for any misalignment, except when the reflected image of the bright line reticle is coincident with the bright line reticle itself, i.e. the aligned condition.

SUMMARY OF INVENTION

Thus it is desirable to have an optical alignment apparatus and method capable of quantitatively establishing deviations of axes of optical components from an arbitrarily selected or specified reference axis.

It is further desirable to have an optical alignment apparatus and method capable of ascertaining the orientation of the axis of an optical component relative to the axis of an optical system without reliance on mechanical interfaces and tolerances so that components of irregular and/or undefined geometric configurations may be positioned in proper optical alignment in an optical system.

It is further desirable to have an optical alignment apparatus and method capable of use with optical components or any other components having low reflective properties.

It is further desirable to provide a black background reticle which is capable of projecting a bright line reticle and yet whose dark background does not prevent return of the reflected image of the bright line reticle through that black background.

In one embodiment the invention may be accomplished by optical apparatus adapted for use with an alignment instrument including a bright line reticle with a dark field background, condenser means for directing radiant energy through the bright line reticle, an alignment reference reticle representative of the reference axis and image projection and return means for projecting an image of the bright line reticle to the instrument and for receiving the projected image reflected back from the instrument and transmitting that reflected image to the reference reticle to provide a quantitative representation of the displacement between that reflected image and the reference reticle.

Such structure, when used with an optical alignment instrument having an optical micrometer for adjusting the position of the reference axis to positions parallel to itself, along two axes each perpendicular to the reference axis, may be employed to locate the evolute of a curved surface of an optical component having low reflectivity, the evolute being on the near side of the component, by projecting an image of the bright line reticle along the reference axis to a position proximate the evolute of the surface, reflecting the image by means of the optical component back to the reference reticle and then measuring the distance between the reference reticle and the reflected image and measuring along the reference axis the distance between the evolute and the effective position of the reference reticle to define the location of the evolute of the surface relative to the reference axis.

Similar methods may be employed to find an evolute on the far side of the component working with the effective evolute produced by the component itself; and the orientation of anamorphic components may also be determined using similar methods with the aid of a rotatable bright line reticle image.

DISCLOSURE OF SPECIFIC EMBODIMENT

Other objects, features and advantages will appear from the following description of a preferred embodiment of the invention, taken with the accompanying drawings, in which.

Figure 1:
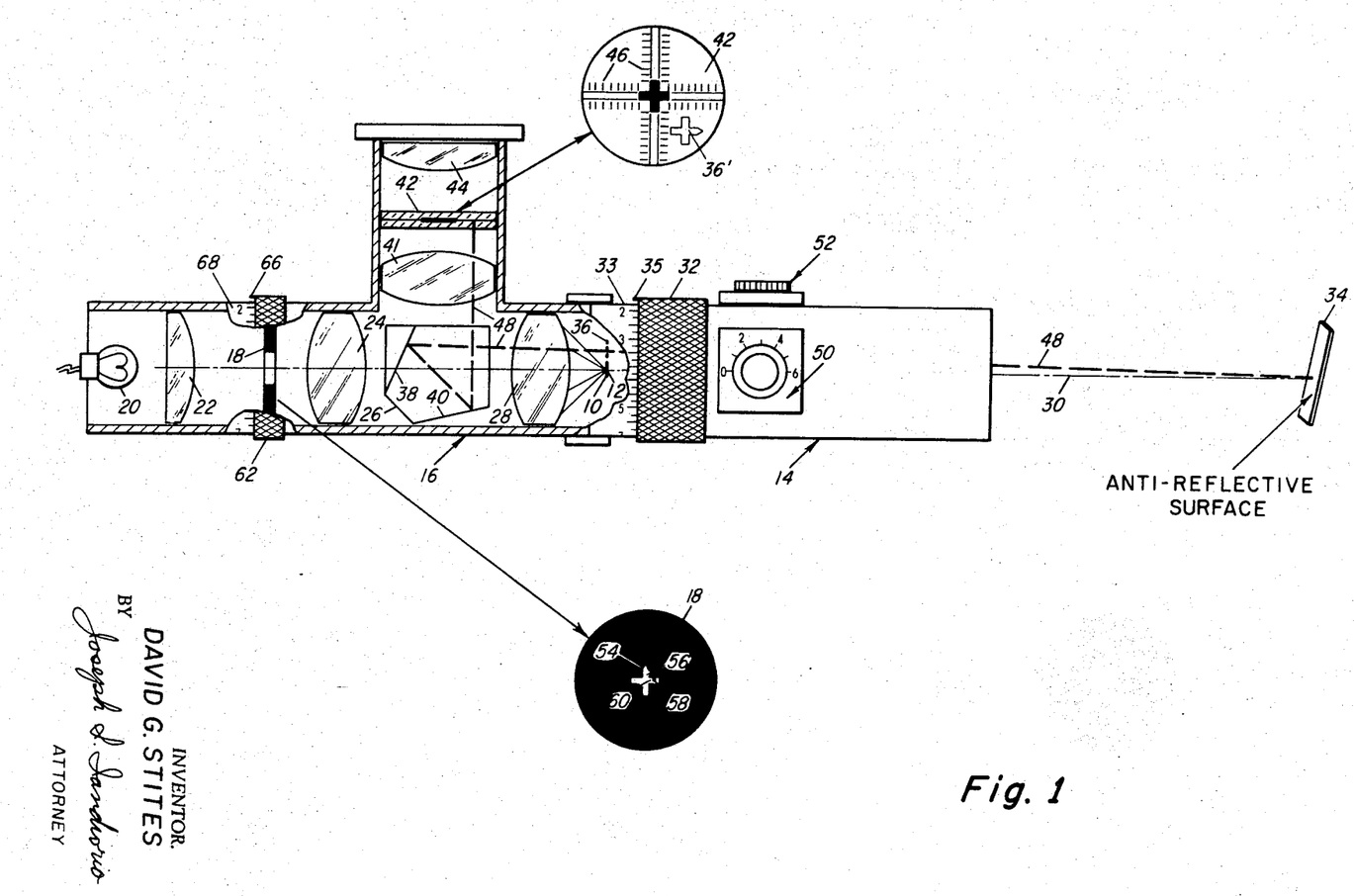
FIG. 1 is a diagram of optical apparatus according to this invention assembled with an alignment telescope.

In accordance with one embodiment of the invention, shown in FIG. 1, an image 10 of a bright line, dark field background reticle is presented at position 12 in alignment telescope 14 by optical apparatus 16. Image 10 is formed by illuminating a bright line, dark field background reticle 18 with light from lamp 20 focused on reticle 18 by lens 22. Lens 24 collimates the light from reticle 18 and directs it through modified pentaprism 26, which passes the light from the direction of lens 24 without reflection, to lens 28 which produces image 10 at position 12.

Alignment telescope 14 projects image 10 along its main or system axis which is the optical reference axis 30 of the instrument. The distance that image 10 is projected is controlled by range control ring 32 which adjusts the object and image distances of telescope 14 by means of movable optics in the usual way and indicates the range on calibrated distance scale 33 by means of pointer 35 on ring 32.

The entire device, including optical apparatus 16 and the telescope instrument, may be used to determine the alignment of a workpiece 34 relative to reference axis 30 by projecting the bright line image 10 to the surface of workpiece 34, which need not have high reflectivity, and comparing the positions of the returning reflected image 36 and the projected image 10. Reflected image 36 appears above reference axis 30 and closer to the observer relative to image 10 at position 12 because workpiece 34 is tilted upward and outward relative to reference axis 30.

This comparison may be accomplished in apparatus 12 by collimating, by means of lens 28, the light from reflected image 36 and directing it into modified pentaprism 26 which double reflects light received from the direction of lens 28 by means of surfaces 38 and 40, effectively turning reference axis 30 through 90°. The light reflected from prism 26 is collected by lens 41 which forms image 36' on dark line, bright field background reference reticle 42 which is viewable through an eyepiece 44, where the tilting of workpiece 34 is again observable by the displacement of image 36' on reticle 42. Reticle 42 is fixed in alignment with reference axis 30 so that the displacement of reflected image 36' from the center of reticle 42 may be calibrated by means of indicia 46 on reticle 42 in accordance with displacement of reflection axis 48 from reference axis 30. Such comparison could not be effected if the bright line, dark field background reticle were located at position 12, where dark line, bright field background reticles have been used in the past, for the dark field of reticle 18 would block the reflected image 36. The present structure replaces the reticle 18 with an image 10 of the reticle whose dark field background is the absence of light rather than an opaque object, and thus passage of the reflected image is permitted.

Alternatively, and in accordance with a preferred embodiment of the invention, horizontal (X) 50 and vertical (Y) 52 optical micrometers may be included in telescope 14 for shifting reference axis 30 to positions parallel to its initial position at the optical axis of telescope 14 and apparatus 16. In initially micrometers 50 and 52 may be set at zero displacement, then manipulated to shift reference axis 30 until the reflected image 36' is aligned with reticle 42. The readings on micrometers 50 and 52 will then show the actual displacement between image 10 and reflected image 36.

The orientation of workpiece 34 may be calculated once the vertical and horizontal (X and Y) displacements of image 36 relative to image 10 at position 12 and the distance from workpiece 34 to position 12 are known, or alternatively, once the X and Y displacement of image 36' relative to reticle 18 and the distance from workpiece 34 to the effective position of reticle 18, i.e. position 12, is known.

The use of optical micrometers enables correction at every range setting for the normal nonlinearity of the reference axis of the alignment instrument, so that the inherent alignment errors of the instrument are not imparted to the measurements made with the optical components.

In some applications of this device, to be discussed more fully later, it is desirable to distinguish when the reflected image is reversed in the horizontal or vertical directions. To accomplish this a distinguishing feature is associated with one of the vertical members of the reticle, either above or below the horizontal member, and another is associated with one of the horizontal members, either to the left or right of the vertical member. Many different reticles may be used with this invention and nonsymmetrical designs may be used to provide for detecting inversions. In the embodiment of FIG. 1 a triangular portion 54 is removed from upper member 56 of reticle 18 and rectangular portion 58 is removed from right member 60.

In other applications of the device, also to be discussed more fully later, it is desirable to be able to rotate the projected image 10 about reference axis 30 either directly, or indirectly, by rotating reticle 18. This is accomplished in the embodiment of FIG. 1 by mounting reticle 18 in rotatable ring 62. A reference mark on reticle 18 such as triangular extension 54 on member 56, or member 56 alone, may be aligned with pointer 66 on ring 62 so that when member 56 is in the upright position pointer 66 is aligned with the zero position on scale 68. Thus pointer 66 indicates the angular displacement of reticle 18 and image 10.

Apparatus 16 is shown with a lamp 20 delivering visible light to form the images of the apparatus and telescope, but the invention is not limited to that form of radiation. Many different frequencies of radiation may be used, such as infrared and ultraviolet. If radiation invisible to humans is used in systems to be controlled by human operators, adaptive mechanisms may be necessary to enable the operator to sense the images. Provision must also be made for the different characteristics of the optical elements in the apparatus and telescope when reflecting and transmitting radiation of various wavelengths. Because of the broad spectrum of radiation usable with the invention, the use of terms such as optical, telescope, lens, image, are not used in a restrictive sense as referring only to things which can be seen by the human eye or which work with the medium of visible light. In addition to its applicability to alignment work with low reflective elements, the bright line reticle structure may be used in a manner similar to some uses of a laser light source. That is, a bright line reticle structure, because of its provision of a bright concentrated light source, may be used to illuminate and/or align objects in darkness or objects illuminable by the structure only through a small aperture. Lasers provide such a service but cannot be sighted through as can be a telescope or the like.

One of the important features of this invention is its ability to quantitatively determine the exact spatial position of the evolutes of curved optical components such as lenses, mirrors, and special prisms, without requiring the components to have precise mounting surfaces, and even though the reflectivity of these components is very low, as is the case with lenses and prisms having antireflection coatings.

It should be understood that the methods of the invention set forth herein are theoretically applicable, but impracticable to use with dark line reticles.

Figure 2:
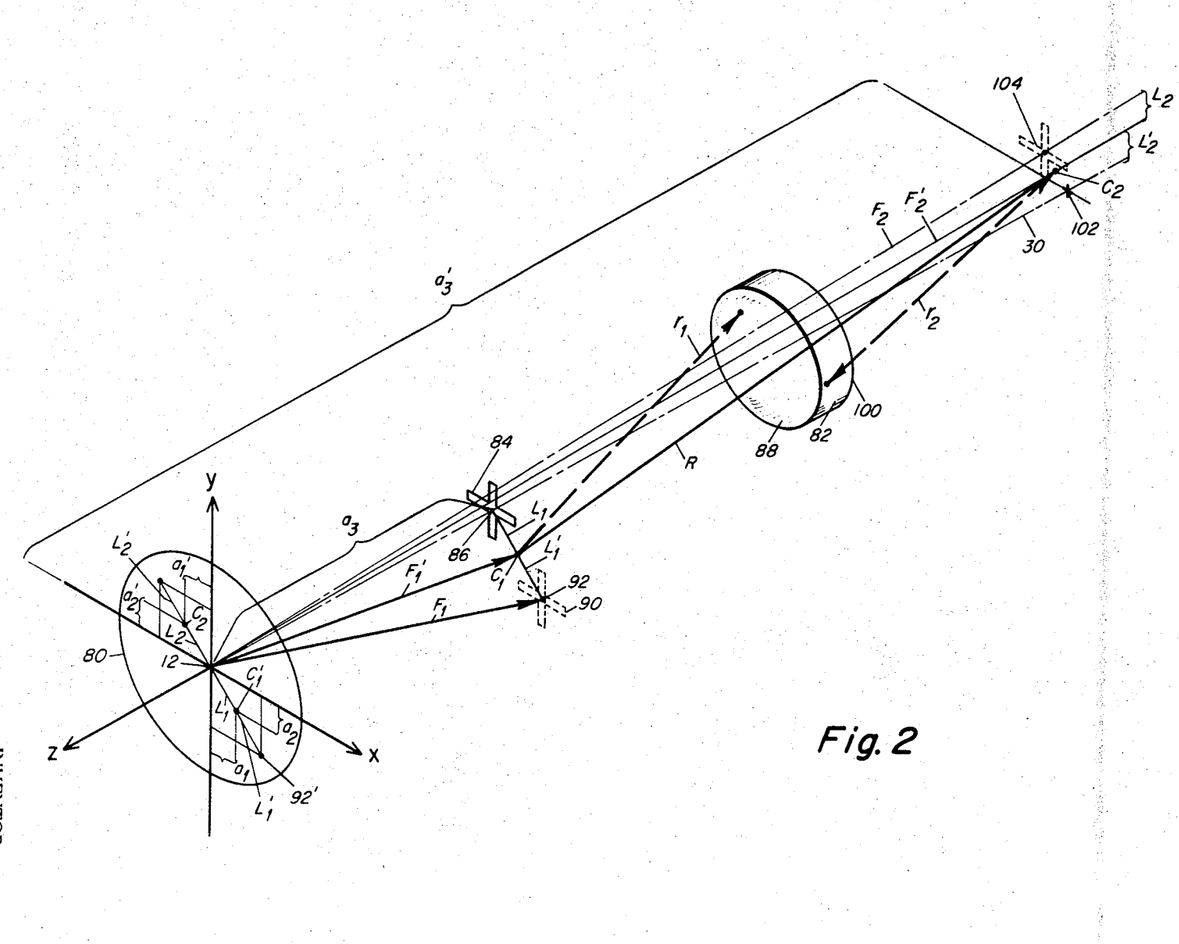
FIG. 2 is a diagrammatic showing of the relevant points and distances used in establishing the location of centers of curvature and the optic axis of an optical component according to this invention.

One method, according to this invention, of determining the evolute or center of curvature on the near side of an optical component using the structure of FIG. 1 is shown schematically in FIG. 2 where the optical axis of a concave lens is located by determining the evolutes or centers of curvature of the two lens surfaces. It should be 3that the center of curvature is but one type of evolute and generally refers to a point in relation to a spherical surface. For example, when a cylindrical optical component is being aligned the evolute is a line, and when an elliptical optical component is being aligned the evolute is a circle.

Disc 80 is a spatial representation of position 12, FIG. 1, the effective position of reticle 18 from which the distance to a projected image or a workpiece is measured. The optical axis of telescope 14 and apparatus 16, reference axis 30, is positioned to pass through the apparent center of concave lens 82 and image 10, not shown in FIG. 2, is projected along reference axis 30 by telescope 14, also not shown in FIG. 2, to form projected image 84. Projected image 84 is formed centered on axis 30 at point 86 which is the apparent center of curvature of surface 88 of lens 82. The true center of curvature $C_1$ of surface 88, whose distance from surface 88 is shown as radius $r_1$, is laterally displaced from point 86 by distance equal to line $L_1$, which displacement causes the reflected image 90 formed by surface 88 to be laterally displaced an equal distance along line $L_1$, from center of curvature $C_1$ in the opposite direction from point 86 on reference axis 30, so that the center of reflected image 90 lies at point 92.

The position in space of point $C_1$ may now be determined with reference to the X, Y, and Z axes passing through point 12 where the Z axis corresponds to reference axis 30 and the X and Y axes correspond to the horizontal and vertical directions.

Reference axis 30 is shifted to positions parallel to its initial position in the direction which causes images 84 and 90 to approach each other until projected image 84 and reflected image 90 merge. Alignment of these two images, such as represented by the superpositioning of image 36' on reticle 42 in FIG. 1, indicates that the center of projected image 84 is located at the center of curvature $C_1$ of surface 88. To reach this point reference axis 30 and projected image 84 located thereon have moved the distance equal to line $L_1$ and image 90 has moved an equal distance along line $L_1'$ in the opposite direction. The X and Y components, $a_1$ and $a_2$, respectively, of line $L_1$ define point $C_1$ with respect to the X and Y axes, and the values of $a_1$ and $a_2$ may be read directly from optical micrometers such as micrometers 50 and 52, if an instrument similar to telescope 14 is used. The distance $a_3$ measured along reference axis 30 between the effective position of the reference reticle, position 12, and the projected image 84, may be read directly from range scale 33 associated with ring 32, in the structure of FIG. 1. The bound vector representing the position of reflected image 90 relative to the initial position of reference axis 30 thus may be expressed:

$$\vec{F}_1 = a_1\hat{i} + a_2\hat{j} + a_3\hat{k}$$

and the bound vector representing the position of the center of curvature $C_1$ of surface 88 relative to reference axis 30 may be expressed:

$$\vec{F'}_1 = \frac{(a_1\hat{i} + a_2\hat{j})}{2} + a_3\hat{k}$$

where $\vec{F}_1$ is the vector representing point 92, $\vec{F'}_1$ is the vector representing $C_1$, and $\hat{i}, \hat{j}$, and $\hat{k}$ are unit vectors.

A second application of the method and apparatus of this invention is in finding the evolute or center of curvature lying on the far side of an optical component. Such application is shown in FIG. 2 where image 10 is projected along reference axis 30, through lens 82, to the apparent center of curvature of surface 100 at point 102 to form projected image 104 laterally displaced from point 102. The true center of curvature $C_2$ of surface 100, whose distance from surface 100 is shown as radius $r_2$, is laterally displaced from point 102 by a distance equal to the length of line $L_2$ which displacement causes the reflected image 104 formed by surface 100 to be laterally displaced an equal distance along line $L_2'$ from $C_2$ in the opposite direction from point 102. In this configuration the projected image produced by the telescope cannot be formed on the far side of lens 82 independent of lens 82. Thus that projected image becomes the reflected image 104 displaced by any misaligning characteristics of lens 82, from point 102 where the projected image was to be formed.

Since in this application the projected image must be transmitted through the optical component, and the center of curvature on the far side of the component must be observed through the component, the magnification characteristics of the component may cause the center of curvature to appear farther or nearer than it truly is. But it has been found that in such cases the component becomes as a part of the telescope system and the distance observed at the telescope range control when the image is correctly placed on the far side of the component is a proper distance and renders correct calculations.

Knowledge of the particular optical components is required if highest accuracy in quantizing their alignment errors is necessary. This knowledge consists of information regarding the optical component curvatures, thicknesses, and refractive indices. Such information when used in optical design equations will permit the determination of the magnification power of the optical component or components which the alignment telescope beam must be passed through to observe spatial positions within the component or assembly of components being evaluated. Depending upon the accuracy required, one may work with the lens maker's formula and calculate its power in diopters, or the thin lens equation for lens focal length may be used, or for highest accuracy, the thick lens equation can be employed. The above mathematical formulas are known to those skilled in the optics science.

The position in space of point $C_2$, FIG. 2, may now be determined in a manner similar to that used previously in the determination of the position of $C_1$ with reference to axes X, Y, and Z. Reference axis 30 is shifted to positions parallel to its initial position in the direction which causes projected-reflected image 104 to approach point 102, until projected-reflected image 104 and point 102 merge. This action is discernible using the apparatus of FIG. 1 by observing the motion of image 36', the counterpart of projected-reflected image 104, with respect to reticle 42. When image 36' and reticle 42 are superimposed, projected-reflected image 104 is at point $C_2$. To reach this point, reference axis 30 and projected-reflected image 104 have moved equal and opposite distances along lines $L_2$ and $L_2'$, respectively. The X and Y components, $a_1'$ and $a_2'$, respectively, of line $L_1$, define point $C_2$ with respect to the X and Y axes and the values of $a_1'$ and $a_2'$ may be read directly from optical micrometers such as micrometers 50 and 52, if an instrument similar to telescope 14 is used. The distance $a_3'$, along reference axis 30 between the effective position of the reference reticle, position 12, and the projected-reflected image 104, may be read directly from range scale 33 associated with ring 32 of telescope 14. The vector representing the position of projected-reflected image 104 relative to the initial position of reference axis 30 thus may be expressed:

$$\vec{F}_2 = a'_1\hat{i} + a'_2\hat{j} + a'_3\hat{k}$$

and the vector representing the positions of the center of curvature $C_2$ of surface 100 may be expressed:

$$\vec{F'}_2 = \frac{(a'_1\hat{i} + a'_2\hat{j})}{2} + a'_3\hat{k}$$

where $\vec{F}_2$ is the bound vector defining image 104 and $\vec{F'}_2$ is the vector representing $C_2$ and $\hat{i}, \hat{j}$, and $\hat{k}$ are the unit vectors. Finally, the bound vector $\vec{R}$ representing the optic axis between centers of curvatures $C_1$ and $C_2$ may be expressed:

$$\vec{R} = \vec{F'}_1 - \vec{F'}_2,$$

which defines the optic axis of the lens 82 with respect to the initial position of reference axis 30.

Using the techniques and structures of this invention, an absolute quantitative determination of the alignment position of an optical component or system of components may be made and the components or systems may be fastened in place, properly optically aligned on a common axis, without precise mechanical structures, and even though the components have irregular and undefined mounting surfaces.

Of course it is essential when using these techniques and structures to be sure to project the image at the proper place and to know the type of reflection sought. In some optical components the center of curvature may be coincident with a reflected surface image or center of curvature of another surface, or the image-forming area of an optical component may be large so that more than one image may appear there. These problems are compounded when it is an optical system rather than a single component that is to be aligned.

These problems may be overcome by studying the component or system to be aligned so that the reflections encountered during alignment may be anticipated and by making provision in the equipment used to distinguish different types of reflections. For example, a surface reflection is always inverted and may be distinguished by marking the reticle as at 54 and 58 FIG. 1. Multiple coincident images may be detected by the increased brightness of the reflected image because of the reinforced reflections; a brightness detector, human or photoelectric such as disclosed in FIG. 4 may be used to sense the increased brightness.

The orientation of an anamorphic optical component such as a cylindrical lens may also be quantitatively defined whether it be tilted or displaced laterally with respect to the image plane perpendicular to reference axis 30 or with respect to rotation of its cylindrical axis about reference axis 30.

The alignment of optical components having nonspherical surfaces, i.e. elliptical, cylindrical, and other surfaces, may also be accomplished using the methods and structure disclosed supra. For example, cylindrical surfaces often used in anamorphic optical systems may be aligned as to tilt, decenter, and rotational errors as shown in FIGS. 3a, 3b, 3c, and 3d, in which only the cylindrical surface of a cylindrical lens is shown for clarity.

Figure 3A:
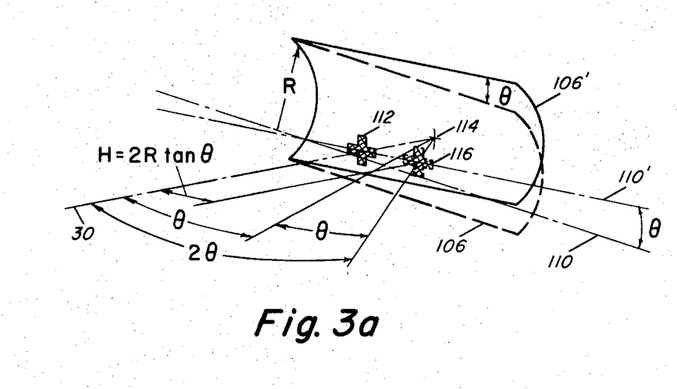
FIG. 3a is a diagram showing an analysis of tilt error of a cylindrical lens.

In Fig. 3a cylindrical surface 106, shown in phantom, is properly aligned with reference axis 30 so that the cylindrical axis 110, which is also the evolute or locus of centers of curvature of cylindrical surface 106, is perpendicular to reference axis 30. Surface 106, as it would appear tilted $\theta$ degrees, is represented by full line surface 106' whose evolute or axis 110' is also tilted $\theta$ degrees to the proper position represented by axis 110. Under these conditions, projected image 112 from the examining instrument is not normal to surface 106' at point 114, but forms an angle of incidence equal to $\theta$, the tilt angle of the surface 106'. The reflected image 116 is therefore reflected back and focused displaced along cylindrical axis 110' a distance H from projected image 112, or an angular displacement of $2\theta$. H is therefore equal to $2R\tan\theta$.

Figure 3B:
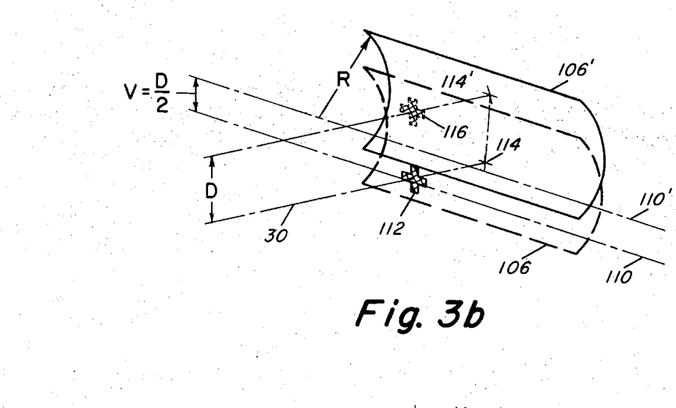
FIG. 3b is a diagram showing an analysis of decenter error of a cylindrical lens.

Decentering error is depicted in Fig. 3b where cylindrical surface 106 is actually displaced a distance V above reference axis 30 as represented by surface 106'. This results in image 112 being doubly reflected so as to be incident at points 114 and 114' on surface 106'. Reflected image 116 is thus formed a distance 2V above image 112.

Figure 3C:
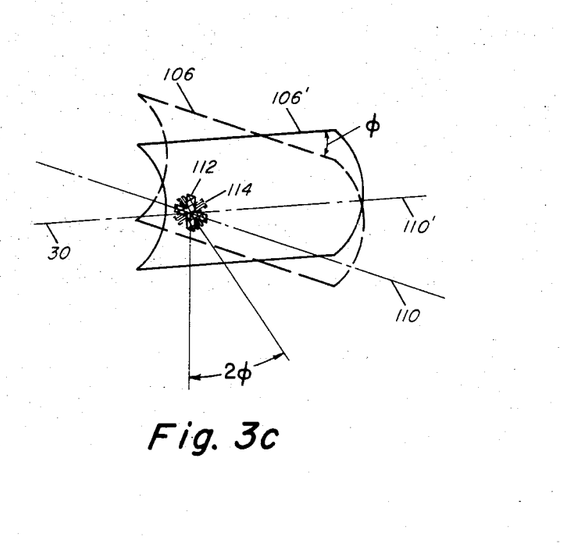
FIG. 3c is a diagram showing an analysis of rotational error of a cylindrical lens.

In Fig. 3c the position of surface 106' is rotated $\Phi$ degrees relative to surface 106 so that cylindrical axis 110' is displaced $\Phi$ degrees from axis 110. This results in an angular displacement of $2\Phi$ of image 116 relative to the position of image 112.

Figure 3D:
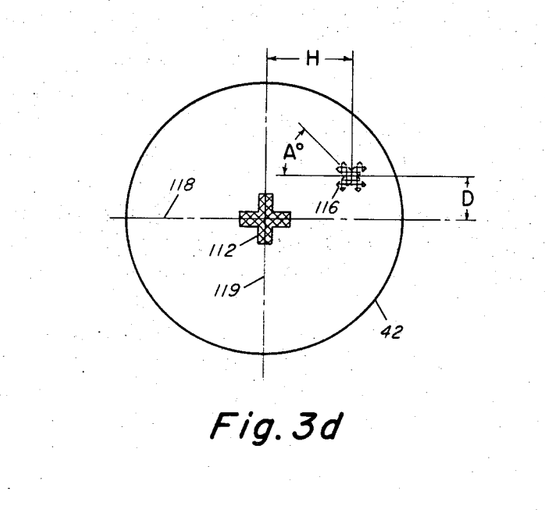
FIG. 3d is a diagram showing a lens having all of the errors shown in FIGS. 3a, 3b, and 3c as it may appear when observed through an apparatus such as shown in Fig. 1.

Were the tilt, decenter and rotational errors shown in FIGS. 3a, 3b, and 3c, respectively, to be simultaneously imparted to a cylindrical lens, these errors would result in a view similar to Fig. 3d at eyepiece 44, FIG. 1. Proper alignment in FIG. 3d would be the condition in which the cylindrical axis of the cylindrical surface is parallel to and in the same plane with horizontal axis 118. The conglomerated errors of FIGS. 3a, 3b, and 3c, then, would be observed by the displacement of image 116 relative to reference reticle 42. Tilt error is apparent from the displacement H between reflected image 116 and reference reticle 42 along axis 118. The tilt error angle may be calculated, when the radius of curvature R of the cylindrical surface is known, by the expression $\theta = \arctan(H/2R)$. Decenter error is apparent from the displacement D between reflected image 116 and reference reticle 42 along axis 119. The decenter error distance V may be calculated simply by the expression $V = D/2$. Decenter error transverse to the cylindrical axis is the only type treated herein because it is the nature of cylindrical lenses that decentering parallel to that axis causes no error. Rotational error is apparent from the angular displacement A of image 116 relative to reference reticle 42. The rotational error angle $\Phi$ may be calculated from the expression $\Phi = A/2$.

The values of H, D, and A may be measured by means of scales associated with the eyepiece or reference reticle, or by means of the scales associated with the rotational, range, X and Y controls. For example, to measure the distance V directly using the apparatus of FIG. 1, reference axis 30 is shifted vertically, upwardly, until image 116 merges with reticle 42. When this occurs reference axis 30 will have moved the distance V as recorded by Y micrometer 52. To measure the angle A° or $2\Phi$, reticle 18 is rotated by means of ring 62, thereby rotating image 116 until maximum brightness of that image is attained; the angle A° may then be read from scale 68 at the position of pointer 66.

Figure 4:
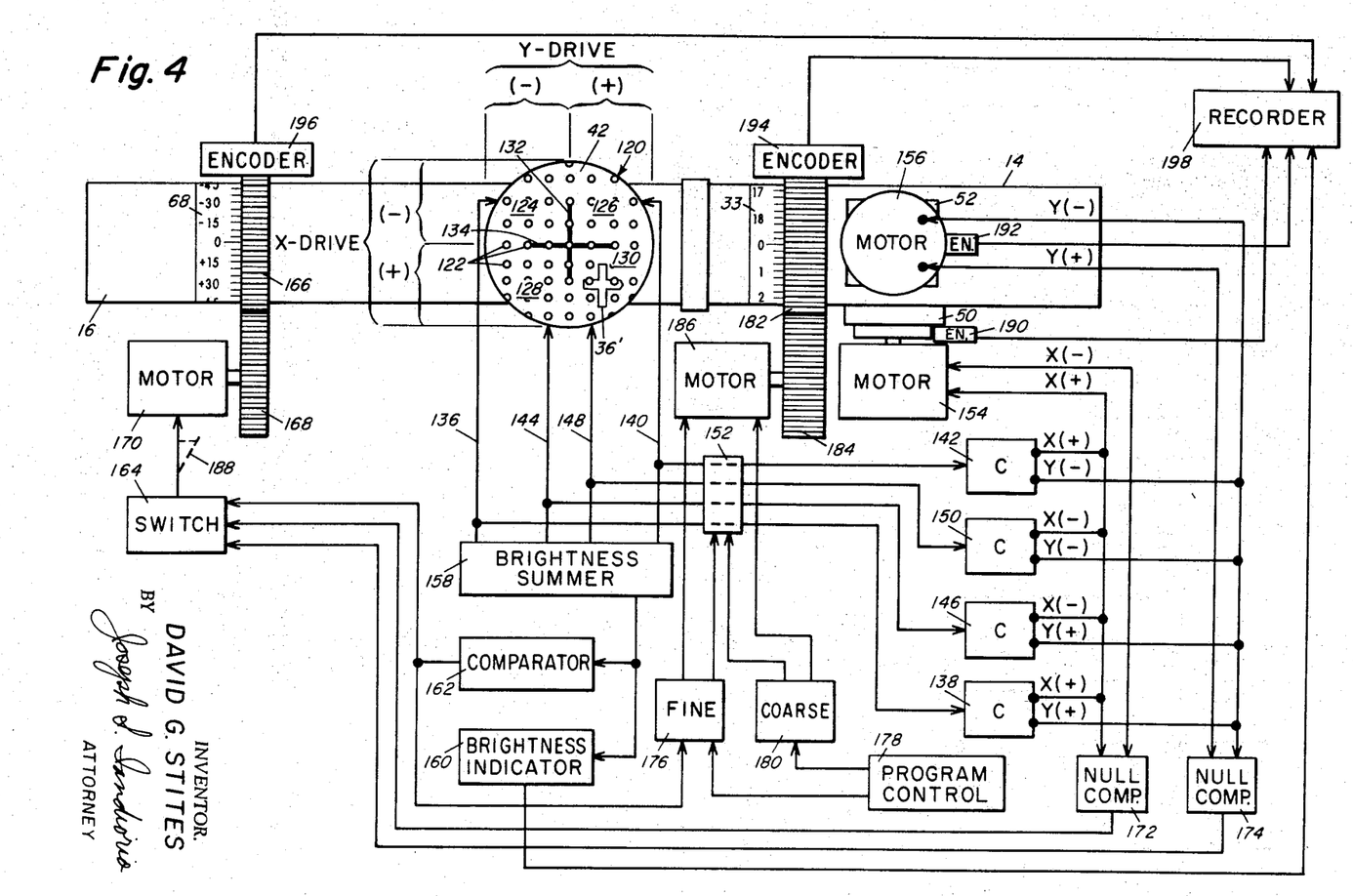
FIG. 4 is a schematic of an automatic control system for the apparatus of FIG. 1.

A simple system for carrying out the invention automatically using a structure similar to that of FIG. 1 is shown in FIG. 4 where parts similar to those in FIG. 1 are labeled with like numbers.

In Fig. 4 the eye of the observer at eyepiece 44 in FIG. 1 is replaced by sensor 120 including photosensitive elements 122 for sensing the light from reticle 42 and image 36'. Sensor 120 is circular in shape and is divided into four quadrants or zones 124, 126, 128, and 130. The vertical position of the projected image in the space ahead of telescope 14 is controlled by the Y micrometer 52 and is detectable by the location of image 36' relative to the reticle 42. If image 36' appears above horizontal member 132 of reticle 42, i.e. to the right of it in FIG. 4, the projected image in space is above the reference axis. In this half of sensor 120, which includes zones 126 and 130, the Y position is designated as positive or (+). In the other half of sensor 120, which includes zones 124 and 128, the Y position is designated as negative or (−). The horizontal position of the projected image in space is controlled by the X micrometer 50 and is detectable by the location of image 36' which appears to the right of vertical member 134 of reticle 42, i.e. below it in FIG. 4; thus, the projected image is to the right of the reference axis. In this half of sensor 120, which includes zones 128 and 130, the X position is designated as positive or (+). In the other half of sensor 120, which includes zones 124, and 126, the X position is designated as negative of (−). Therefore zones 124, 126, 128, and 130 have the following X and Y designations: zone 124—X (−), Y (−); zone 126—X (−), Y (+); zone 128—X (+), Y (−); zone 130—X (+), Y (+). And an image 36' located in any of the zones must be driven in the opposite sense to reach the center of reticle 42, i.e. an image in zone 130, where the condition is X (+) and Y (+), must be driven in the X (−) and Y (−) directions to reach the center of reticle 42. This movement may be accomplished by feeding the outputs of all of the elements 122 in one zone to a comparator which compares the output signals to an internally generated reference signal. The output of zone 124 is fed over line 136 to comparator 138; the output of zone 126 is fed over line 140 to comparator 142; the output of zone 128 is fed over line 144 to comparator 146; the output of zone 130 is fed over line 148 to comparator 150. Switch 152 controls the inputs to comparators 138, 142, 146, and 150.

A displaced image 36' causes a signal from the zone in which it is located to be delivered to the corresponding comparator. That comparator produces an X and a Y output, either (+) or (−) as its inputs are (−) or (+) to the X drive motor 154 and the Y drive motor 156 to adjust X micrometer 50 and Y micrometer 52, respectively, in the proper direction to move image 36' into alignment with reticle 42. For example, with the image 36' displaced in zone 130, as shown in FIG. 4, comparator 150 produces X (−) and Y (−) outputs to motors 154 and 156, respectively, which aligns image 36' with reticle 42. In the aligned condition the outputs from each comparator are equal and cancel each other.

The outputs from sensor 120 are also submitted to brightness summer 158 which produces an output representative of the total brightness sensed at reticle 42. This output is delivered to brightness indicator 160 which displays an indication of the brightness on a calibrated scale, and is also delivered to comparator 162 which initially compares that output to an internally generated reference signal and then compares each new incoming value to the previously received value and provides an output when the later signal is larger: that is, comparator 162 delivers an output as long as the brightness is increasing.

The output of comparator 162, when passed by switch 164, drives gear 166, externally mounted to ring 68, FIG. 1, through gear 168 and motor 170 to locate reticle 18 and image 10, FIG. 1, in a position resulting in maximum brightness of the reflected image 36, such as is desirable in orienting the major axis of a cylindrical lens. Comparator 162 may be designed to open switch 164 when the detected brightness level is at its maximum to cease further operations of motor 170. Switch 164 is enabled by two coincident signals from null comparators 172 and 174 indicating that the X and Y signals to motors 154 and 156 are nulled and image 36' is aligned with reticle 42.

The output of comparator 162 is also supplied to fine control 176, along with a signal from program control 178 which may be an automatic or manual control device. Program control 178 causes coarse control 180 to set range control ring 32, FIG. 1, to a desired range by means of gear 182, mounted externally to ring 32, FIG. 1, gear 184 and motor 186. Then program control 178 switches off coarse control 180 and switches on fine control 176 which utilizes the output of comparator 162 to trim the range setting within predetermined limits for maximum brightness. A signal from coarse control 180 as it begins to function opens switch 152 and a signal from fine control 176 when it ceases to function closes switch 152.

Operation is begun by switching on program control 178 which initiates range setting through motor 186. When the range setting is maximized, switch 152 is closed and image 36' is centered on reticle 42 by means of sensor 120, comparators 138, 142, 146, and 150 and motors 154 and 156. Upon the centering of image 36', null comparators 172, and 174 enable switch 164 to pass the output from comparator 162 to rotate reticle 18 by means of motor 170. A switch 188 may be used to isolate motor 170 when this adjustment is not desirable, for example when the component being oriented has no cylindrical optical characteristics.

The settings of each of the X, Y, range, and reticle rotation mechanisms may be stored for future analysis or as a "fingerprint" of the optical component by associating with those mechanisms encoders 190, 192, 194, and 196, respectively, and connecting their outputs and the output of brightness indicator 160 to a recorder 198.

Many different combinations of the optical and electrical components disclosed in these embodiments may be assembled to accomplish the invention and the methods of this invention are performable with other than the specific structures shown herein.

Other embodiments will occur to those skilled in the art and are within the following claims:

What is claimed is:

1. A method of defining the rotational orientation of an anamorphic optical component including:
    establishing a reference axis through said component;
    projecting an image of a first reticle along said reference axis and focusing said image proximate the locus of centers of curvature of said component;
    reflecting said image by means of said component to a reference reticle which is aligned with said reference axis;
    rotating a reference portion of said projected image relative to said reference axis and relative to said reference reticle to a position at which the brightness and clarity of said reference portion of said reflected image is optimized, and said reference portion is parallel to the major optical axis of said component; and,
    measuring the rotational displacement of said reflected image relative to said reference reticle.

2. The method of claim 1 in which said step of projecting an image of a first reticle comprises projecting radiation through a bright line reticle.

3. Optical apparatus for use with an optical alignment instrument, said apparatus having a reference axis associated therewith comprising:
    a bright line reticle with a dark field background;
    means for forming an image of said bright line reticle;
    a reference reticle optically aligned with said reference axis;
    image projection and return means for projecting said image of said bright line reticle along said reference axis through said instrument and for receiving said projected image reflected back through said instrument and transmitting said reflected image to said reference reticle for providing a quantitative representation of the misalignment of said reflected image and said reference reticle;
    means for sensing the intensity of said reflected image at said reference reticle;
    means for comparing the sensed intensity with a reference level; and
    means for rotating said bright line reticle to a position where the intensity of said reflected image is maximized.

4. The apparatus of claim 3 in which said bright line reticle is of nonsymmetrical shape relative to said reference axis.

5. Apparatus as recited in claim 3 wherein said reference reticle comprises a dark line reference reticle having a bright field background and wherein indicia is associated with said reference reticle for providing a quantitative representation of the misalignment of said reflected image and said reference reticle.

6. Apparatus as recited in claim 3 wherein said instrument includes micrometer means associated therewith for adjusting the position of said reference axis to positions parallel to itself for aligning said reflected image with said reference reticle, the readings of said micrometer means providing a quantitative representation of the misalignment between said reference reticle and said reflected image.

7. Apparatus as recited in claim 3 wherein said reference reticle comprises an array of radiation detectors for detecting said reflected image and for generating signals representative of the location of said reflected image relative to said reference reticle, and wherein said apparatus further includes:
    locating means responsive to said signals for determining the location of said reflected image relative to said reference reticle; and
    drive means coupled to said instrument and responsive to said locating means for adjusting the position of said reference axis to positions parallel to itself for aligning said reflected image and said reference reticle.

8. A method for locating the evolute of a curved surface of a reflective optical component relative to a reference axis of an optical alignment device, said evolute being on the near side of said component relative to said device comprising:
    projecting an image of a first reticle along said reference axis through said device and focusing said image proximate an estimated position of said evolute;
    reflecting said image by means of said component back through said device to a reference reticle, said reference reticle being optically aligned with said reference axis;
    measuring the distance between said reference reticle and said reflected image in the plane of said reference reticle;
    adjusting the position of said focused image to coincide with the actual position of said evolute; and
    measuring along said reference axis the distance between said focused image and said device for defining the location of said evolute relative to said reference axis.

9. Optical apparatus in combination with an optical alignment instrument for determining the orientation of a component relative to a reference axis of said instrument, said apparatus comprising:
    a bright line reticle having a dark field background;
    means for directing radiant energy through said bright line reticle;
    means for collecting said radiant energy and for presenting a focused image of said bright line reticle to said instrument for projection therethrough;
    said instrument projecting and refocusing said image at a point a predetermined distance along said reference axis;
    reference means optically aligned with the reference axis of said instrument;
    means for receiving the projected image reflected off said component back through said instrument and for presenting said reflected image to said reference means; and
    means for providing a quantitative representation of any misalignment existing between said reference means and said reflected image to provide a measure of the misalignment of said component relative to said reference axis.

10. Apparatus as recited in claim 9 and further including collimator means for collimating the radiant energy directed through said bright line reticle; and transfer means for transferring said collimated energy to said collecting means and for transferring said reflected image to said reflected image receiving means.

11. Apparatus as recited in claim 10 wherein said transfer means comprises prism means for transferring said collimated energy undeflected to said collecting means and for deflecting said reflected image to said reflected image receiving means.

12. The apparatus of claim 3 further including focusing means for setting the range of projection of said image.

13. The method of claim 8 in which the measuring of the distance between said reference reticle and said reflected image includes:

adjusting an optical micrometer included in said device to shift said reference axis parallel to itself along a first axis perpendicular to said reference axis to establish the micrometer reading at which said reflected image and said reference reticle are aligned relative to said first axis; and, adjusting a second optical micrometer included in said device to shift said reference axis parallel to itself along a second axis perpendicular to said reference axis to establish the micrometer reading at which said reflected image and said reference reticle are aligned relative to said second axis and are thus superimposed on each other.

14. The method of claim 8 in which said step of projecting an image of a first reticle comprises projecting radiation through a bright line reticle.

15. The method of claim 8 in which said optical component is anamorphic and said method further includes defining the rotational orientation of said component relative to said reference axis including:

rotating a reference portion of said projected image relative to said reference axis and relative to said reference reticle to a position at which the brightness and clarity of said reference portion of said reflected image is optimized, and said reference portion is parallel to the major optical axis of said component; and, measuring the rotational displacement of said reflected image relative to said reference reticle.